June 4, 1946.   B. E. MILLS   2,401,434
QUIZ MACHINE
Filed March 9, 1945   4 Sheets-Sheet 1
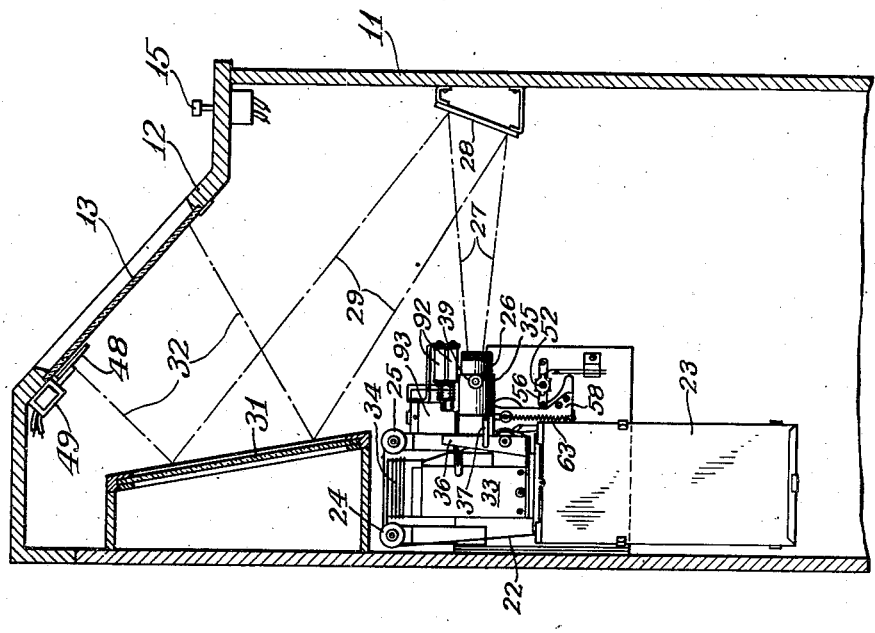
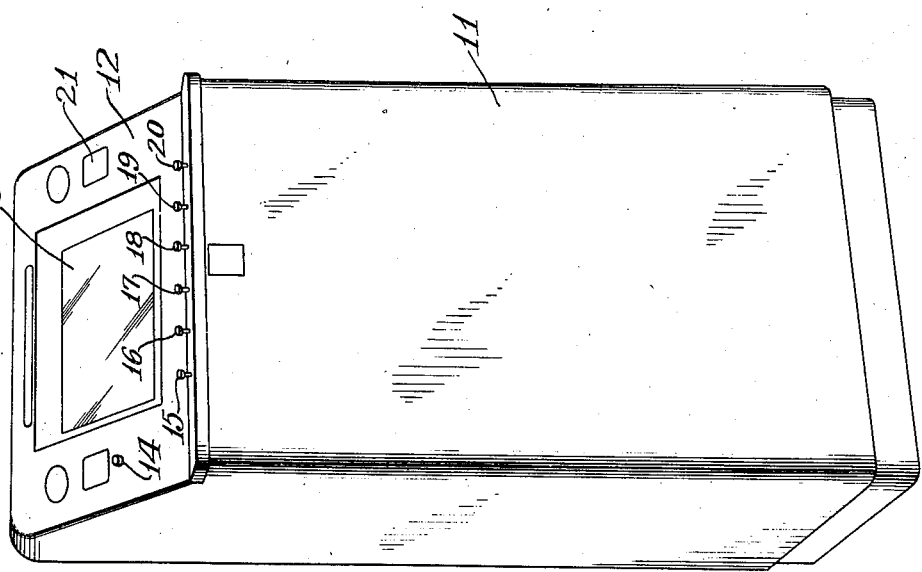
Inventor:
Bert E. Mills
By [signature]
Attorney

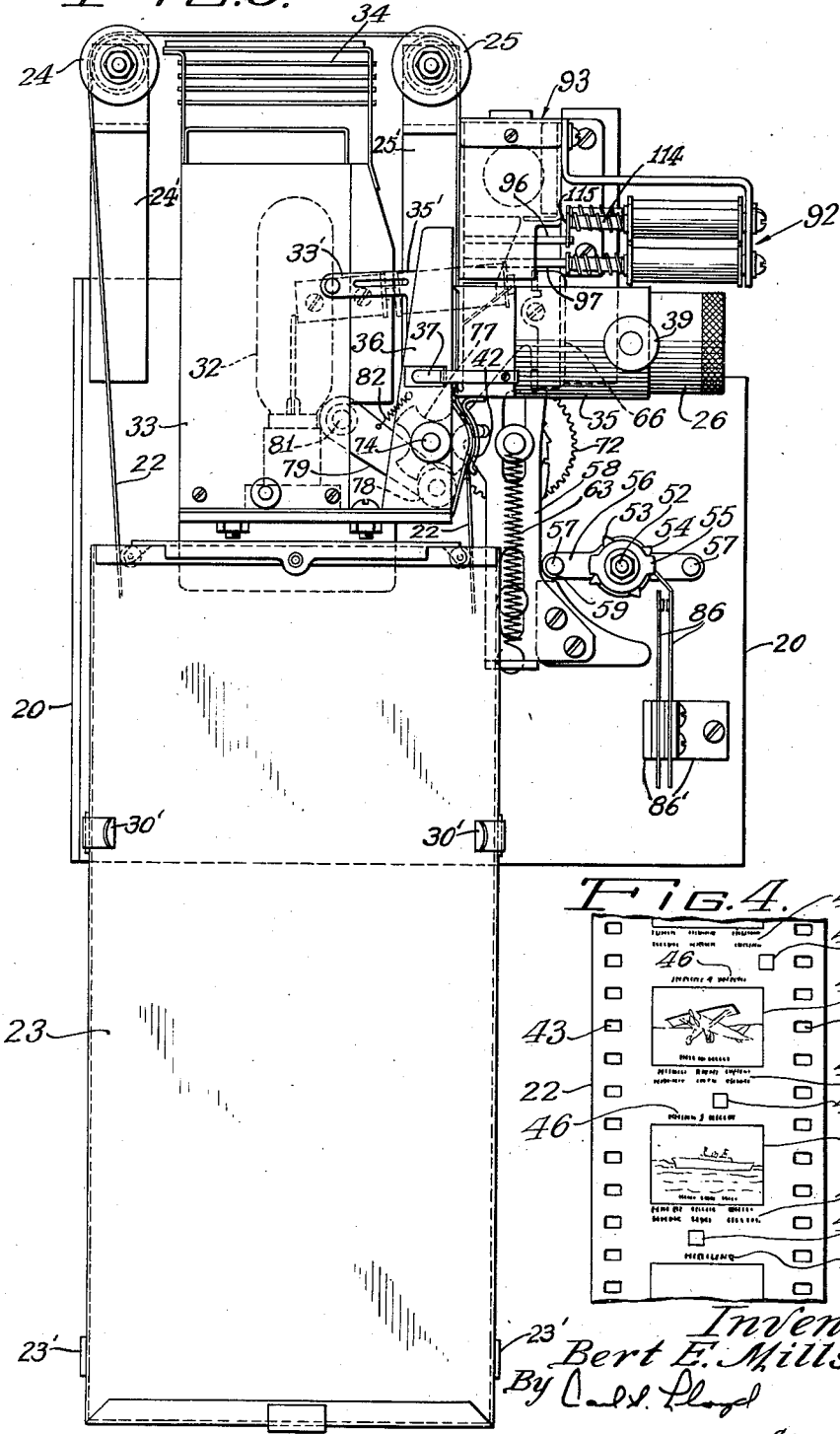

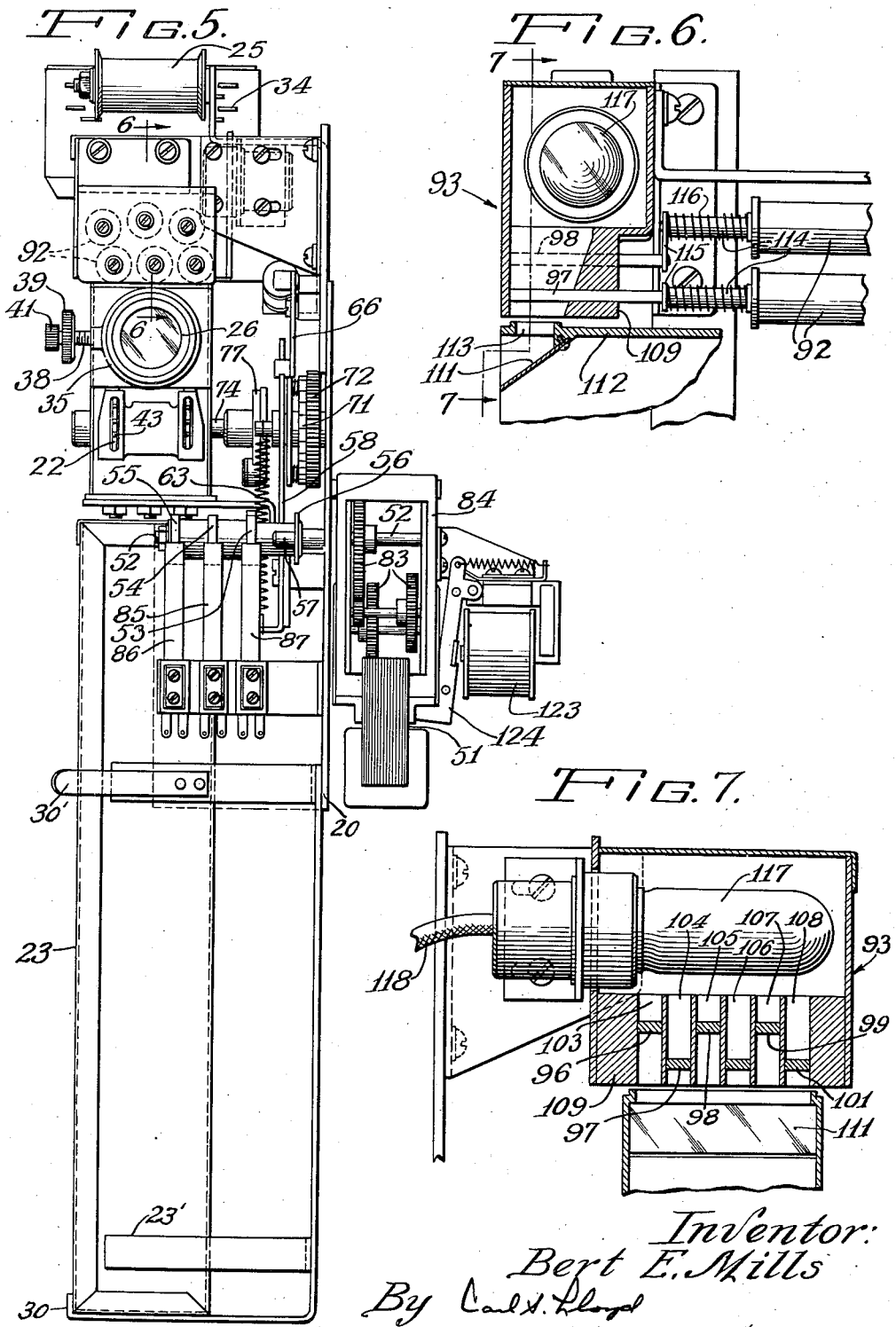

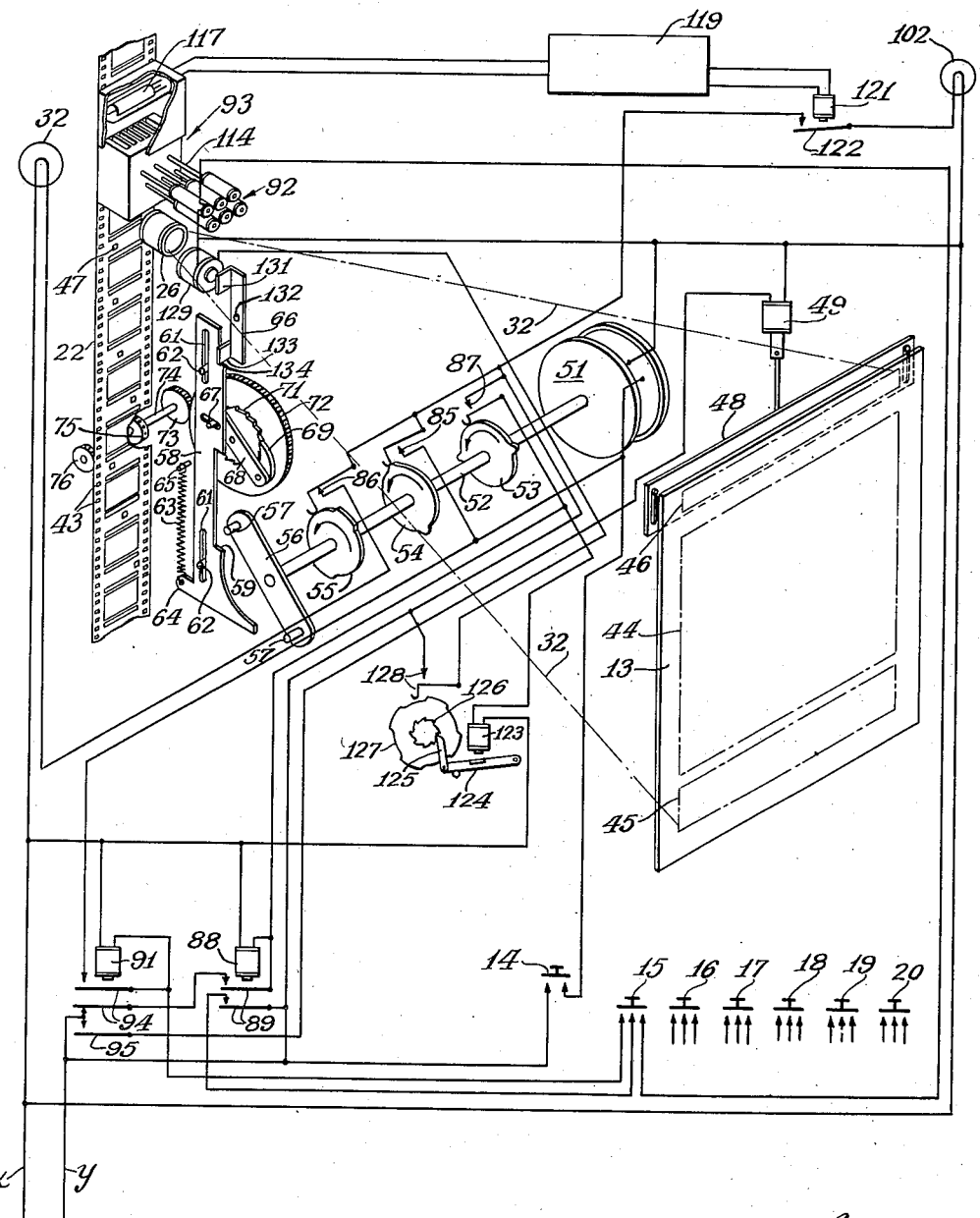

Patented June 4, 1946

2,401,434

UNITED STATES PATENT OFFICE 2,401,434

QUIZ MACHINE

Bert E. Mills, St. Charles, Ill., assignor to Mills Industries, Incorporated, Chicago, Ill., a corporation of Illinois Application March 9, 1945, Serial No. 581,773

14 Claims. (Cl. 35—48)

This invention relates to a self-contained picture machine designed for individual self-rating by the question and multiple-choice answer system.

In general it comprises a projector by which a picture and/or a question, together with a number of possible answers or identifications, are projected from a photographic film onto a screen and a choice of one of such answers is made, as by the pressing of one of a number of buttons corresponding to the number of possible answers. If the correct answer is selected it will be thrown onto the screen and an indicator or scoring device will be actuated. If a wrong answer has been chosen the indicator or scoring device will not be actuated, but, in the particular embodiment of the invention shown in the drawings, the right answer will nevertheless be thrown onto the screen. As shown, the machine requires restarting after one such operation as by the pressing of a starter button, but, as later explained, a series of such operations could be provided for on each energization of the machine if desired.

Competition may be obtained between students or others using the machine by having one of them undertake to answer a given number of questions and then having another undertake to answer a corresponding number, and comparing their scores. The machine is therefore useful for instructional and training purposes as well as for amusement and an important use which has been made of it is for training students in the armed services.

The general object of the invention is to provide a machine adapted to perform accurately and efficiently the functions above mentioned.

Specific objects are to provide in such a machine means for controlling the operation of the indicating or scoring device so that it will be operated only when the right answer has been selected, and means for at times changing the sequence of the pictures or questions so that they will not always be presented in the same order.

Other objects and advantages of the invention will be apparent from the following description taken in connection with the accompanying drawings, in which:

Fig. 1 is a perspective view of the exterior of a machine in which the invention is embodied;

Fig. 2 is a front-to-back sectional view taken through the upper part of the cabinet and showing the lines of projection of the picture onto the screen;

Fig. 3 is a side elevational view of the projection mechanism, the film-feeding mechanism and certain other parts of the machine;

Fig. 4 is a fragmentary plan view of the film;

Fig. 5 is a front view of the mechanism shown in Fig. 3;

Fig. 6 is a sectional view of the so-called integrator taken substantially on the section line 6—6 of Fig. 5;

Fig. 7 is another sectional view of the integrator taken substantially on the section line of 7—7 of Fig. 6; and Fig. 8 is a schematic diagram of the electrical circuits and of certain of the mechanism.

The cabinet of the machine is indicated in Figs. 1 and 2 by the reference numeral 11 and is of any form and design suitable for display in a public room. It preferably has a sloping upper wall portion 12 in which there is a screen 13 which preferably is made of a special translucent plastic material so designed as to diffuse the light and give an even distribution of it over its entire surface. The starting button is shown at 14 and six answer buttons 15 to 20, inclusive, are located on a horizontal ledge beneath the screen. At the side of the screen there is, or may be, a window 21 through which the indicator or scoring device may be viewed.

The film 22 (Figs. 2 and 3) is looped in a container 23, held in place on a mounting plate 20 by a supporting member 30, retainer brackets 23' and spring clips 30', and is adapted to be drawn upwardly at the rear of the machine and over rollers 24 and 25, from the latter of which it is directed downwardly through the projecting mechanism and back into the container 23. Said rollers 24 and 25 are supported on frame uprights 24' and 25' respectively. The projector 26 projects the image forwardly, as indicated by the lines 27 in Fig. 2, to a reflector 28 from which it is directed, as indicated by the lines 29 to a second reflector 31 from which, as indicated by the lines 32, it is directed onto the screen 13.

The projector lamp 32 (see Fig. 3) is positioned in a housing 33, above which is a heat-dissipating element 34, and the projector is mounted in a housing 35 which is adapted to be held in place between uprights 36 by means of spring clips 37 or in any other suitable or preferred manner, the projector being held in the housing by means of a set screw 38 having thereon a knurled nut 39 and head 41 as shown in Fig. 5. The projector mechanism, as such, may be of any standard or preferred type and is not a part of the present invention. The lamp and projector housings are connected together by brackets 33' and 35'.

The film, after passing through the projector, is directed between arcuate guides 42 and, as above mentioned, goes back into the container 23, the ends of said film being connected together so as to form an endless loop and being thus adapted for continuous operation without the necessity of rewinding.

As shown in Fig. 4, the film, which may be a single 35 mm. film, has the usual sprocket holes 43 near the edges thereof and has spaced frames 44 thereon. The picture and/or question is positioned in the central part of the frame and immediately below the picture space there appear, in the present instance, six possible answers or identifications, as indicated at 45, and immediately above such space is the correct answer, as indicated at 46. Below the six possible answers there is a clear space 47 which is in predetermined relation to the one of the six possible answers which is the correct one. In other words, these clear spaces are in different positions transversely of the film and are so located that when the correct answer is selected the light passing through the clear space will cause operation of the indicating or scoring device, whereas if a wrong answer is selected the light passing through the clear space or section of the film will have no effect upon said device.

There is a shutter 48 normally positioned behind the right answer space 46, this shutter being slidably mounted and being connected to a solenoid 49 so that it may be moved out of obscuring position when said solenoid is energized. As above indicated, this is not done until after a selection is made so that when an answer button is pressed only the question and the plurality of possible answers are visible on the screen. As shown, the shutter 48 is withdrawn when any one of the selectors is operated but the arrangement might be such that it would be withdrawn only when the correct answer selector is operated.

Referring now to the diagrammatic view (Fig. 8), the starting button 14 is shown at the lower right center of the figure and is adapted, when depressed, to close a circuit from the power line x, y to a motor 51 arranged to drive a shaft 52 on which there are three double cams 53, 54 and 55 and an actuating lever 56. The latter has an actuating pin 57 at each end thereof and is positioned adjacent a slide 58 having a shoulder 59 thereon adapted to be engaged by one of said pins so as to pull the slide down a predetermined distance upon each operation of the machine. Said slide is formed with slots 61 in which pins 62, fixedly mounted on the frame, are positioned, and the slide is adapted to be normally held in its raised position by means of a spring 63 secured at its lower end to an ear 64 on the slide and at its upper end to a fixed pin 65 on the frame. The upper position of the slide is normally determined by means of a lock lever 66 but the length of the slots 62 is sufficient to permit the slide to be moved farther upward when the lock lever 66 is disengaged therefrom, for a purpose which will later appear.

The slide has a pin-and-slot connection 67 with a ratchet drive arm 68 which carries at its free end a pawl 69 engaging a ratchet wheel 71 rigidly connected to a spur gear 72 which meshes with a pinion 73 on a film drive shaft 74 which carries sprockets 75 and 76 engaging in the sprocket holes 43 of the film to move the latter upon each operation of the machine. As will later appear, the film is ordinarily moved only far enough to bring the next succeeding frame into position in the projector but, under certain circumstances will be moved farther in order to break up the sequence, as has previously been mentioned. The teeth on the sprocket wheel 71 are so spaced that if the pawl 69 engages successive teeth the film will be moved only the distance between adjacent frames upon each operation and if the pawl skips one tooth the film will be moved the distance between two frames.

It should be noted in this connection that a centering star wheel 77 (see Fig. 3) is provided on the film drive shaft 74 so as to hold the frame in centered position, this wheel being engaged by a roller 78 on a lever 79 pivoted at 81 to the frame and being urged towards said centering wheel by means of a spring 82. The strength of the spring and the form of the star points on the wheel are such that when the shaft 74 is rotated, as above described, the roller 78 will ride out of one pocket of the wheel and drop into the next one as the wheel is rotated.

While not shown in the diagram of Fig. 8 there is a speed reduction gear train between the motor 51 and the shaft 52, this being indicated generally in Fig. 5 by the numeral 83, the gearing being mounted in a housing or gear box 84.

Referring again to Fig. 8, as well as to Fig. 5, when the circuit to said projector drive motor is closed by depressing the starter button 14, the cam 54 closes a normally open switch 85 which provides a holding circuit to keep the motor energized for one operation of the machine. The picture changing mechanism is then actuated by means of the lever 56 on the shaft 52, the projector lamp 32 being extinguished during the changing of the picture by means of the cam 55 on said shaft 52 which opens a switch 86 thus breaking the circuit to said projector lamp 32. The switch 86, being normally a closed switch, reestablishes the circuit when permitted to close by said cam 55. Said switch 86 is shown in Fig. 3 as supported by a bracket 86' on the mounting plate 20.

Immediately after the picture is projected onto the screen 13 the cam 53 closes a switch 87 which closes a circuit to a relay 88. A switch 89 on the relay 88 closes circuits to the answer buttons 15—20, only one of which circuits is shown since showing all of them would involve undue complication and it is believed that the operation will be fully understood from the showing of the one circuit.

Assuming now that the answer button 15 is pressed, a circuit will be closed to a relay 91 and also to one of six solenoids, indicated as a group at 92, which control an integrator mechanism 93 through which the indicator or scoring device is operated in manner which will be later described.

A switch 94 on the relay 91 closes a circuit to the correct answer solenoid 49 and opens the circuit to the relay 88, which latter is normally locked in by a switch 95 on said relay 91. The energizing of the solenoid 49 causes the shutter 48 to be lifted, thereby permitting the correct answer to be projected onto the screen in the space 46.

The one of the integrator solenoids 92 which is energized by the pressing of the button 15 will withdraw a sliding bar or shutter 96 (see Fig. 7 and similar shutters 97 and 98 in Fig. 6) of the integrator mechanism 93, provided the right answer has been selected by the pressing of said button 15, and the indicating or scoring device, which I have shown only diagrammatically at 102, will be operated to record the selection of the right answer. If the right answer had not been the one identified with the button 15, said indicator would not have been operated.

In order that the functioning of the integrator may be understood before proceeding with the description of the circuits attention is now called to Figs. 6 and 7, in which the integrator structure is shown in detail.

The solenoids 92 are connected respectively with one of a series of shutters marked 96, 97, 98, 99 and 101, which are positioned in vertical channels 103, 104, 105, 106, 107 and 108 in a block 109. A reflector 111 is mounted beneath said block on a frame member or partition 112 in such position that a part of the light from the projector lamp 32 falls on said reflector. Such light passes through the clear section 47 on the film and therefore the point at which it falls on the reflector 111 will depend upon the particular location of the clear section 47 in the frame which is being projected onto the screen. From the reflector 111 such light will be directed upwardly through an opening 113 in said partition 112 into one of the channels 103—108 depending on the position of the clear section in the film. It will be blocked, however, by the one of the shutters 96—101 immediately above the point at which the light is directed onto the reflector unless such shutter is the one corresponding to the correct answer shutter and has been withdrawn by operation of such selector. The withdrawal of the shutter is accomplished, as above indicated, by one of the solenoids 92, each of which is connected by a rod 114 and an arm 115 with one of the shutters. A spring 116 is provided on each of the rods 114 for returning the shutter to normal position when the associated solenoid is deenergized.

Above the series of channels 103—108 there is mounted a photoelectric cell 117 which is connected by wiring in a cable 118 with an amplifier 119 (diagrammatically shown in Fig. 8) through which a relay 121 is energized, thereby closing a switch 122 in a circuit leading to the indicator or scoring device 102. The amplifier is equipped with a photoelectric cell sensitivity control (not shown) which can be adjusted to different positions to increase the sensitivity of the cell if it has become weak through excessive use, or to decrease the sensitivity if this should be indicated for proper results.

It will thus be apparent that if the answer button which is pressed upon any particular operation is the one for the answer corresponding to the clear section 47 in the film frame which has been projected onto the screen, the light passing through said section will be permitted, through withdrawal of the appropriate shutter 96—101, to reach the photoelectric cell 117 and activate the same to cause operation of the indicator or scoring device.

It will be understood, as above mentioned, that the latter device might take any preferred form, such as a device which would show the score for a series of operations in the space 21 (see Fig. 1), but it has not been deemed necessary to show the details of such a device, since, per se, it forms no part of the present invention.

The closing of the switch 87 by the cam 53 also energizes a relay 123 which attracts an armature 124 carrying a pawl 125 engaging a ratchet wheel 126 on a cam 127 which is mounted on the frame to rotate freely. Positioned adjacent said cam, so as to be closed when the latter is in certain positions, is a switch 128 adapted to close a circuit to a solenoid 129 mounted adjacent the lock lever 66 which normally limits the upward movement of the slide 58. Said locking lever 66 has an angular piece 131 thereon which constitutes an armature adapted to be attracted by the solenoid 129 so as to turn said lever 66 on its pivot 132 and remove an angle piece 133 on the lower end thereof from a shoulder 134 on said slide 58. This permits the slide to travel upwardly the full distance permitted by the length of the slots 61 which receive the pins 62.

Such additional movement of the slide 58 results in causing the pawl 69 to skip one or more teeth of the ratchet wheel 71 so that on the next operation of the drive motor 51 the film will be moved a sufficient distance to carry one or more frames past the projector without being projected, thus breaking the sequence in which the frames appear on the screen. Obviously the form of the cam 127, as well as the length of the slots 61 in the slide 58, may be varied so as to determine, as may be desired, the frequency of the changes of sequence and the extent of movement of the film on each thereof.

While for simplicity I have shown in the drawings a construction in which only one frame would be projected on each operation of the machine, a construction in which a plurality of frames, as, for example, ten, would be successively projected and each remain on the screen a predetermined limited time (long enough to permit selection of an answer to be made and, if correct, scored) before the projector motor is deenergized after the starting button has been depressed is within the range of modifications contemplated by the invention.

Although I have shown and described a specific embodiment of my invention as required by the patent statutes, it is obvious that various changes may be made in the structural details without departing from the spirit and scope of the invention and it is desired that the appended claims be construed accordingly.

I claim:

1. A quiz machine comprising a projector, a screen, a photographic film having thereon a question, a plurality of possible answers and the correct answer, which is one of said possible answers, means for operating the projector to project said question, plurality of possible answers and correct answer toward the screen, a shutter for obscuring the correct answer from view, the question and plurality of possible answers being unobstructed and adapted to be initially thrown onto the screen, a plurality of selectors, one for each of said possible answers, means actuated by operation of any one of said selectors for removing said shutter from obscuring position to bring the correct answer into view on the screen, a correct answer indicating device, and means actuated by operation of the selector for the correct answer to operate said indicating device.

2. A quiz machine comprising a projector, including a source of light, a screen, a photographic film having thereon a question, a plurality of possible answers, and the correct answer, which is one of said possible answers, said film having a clear section therein positioned in predetermined relation to the one of said possible answers which is the correct one, means for operating the projector to project said question, plurality of possible answers and correct answer toward the screen, a shutter for obscuring the correct answer from view, the question and plurality of possible answers being unobstructed and adapted to be initially thrown onto the screen, a plurality of selectors, one for each of said possible answers, means actuated by operation of any one of said selectors for removing said shutter from obscuring position to bring the correct answer into view on the screen, a correct answer indicating device, and means actuated by operation of the selector for the correct answer to operate said indicating device, said last mentioned means including a light-sensitive device adapted to be energized by light from the source aforesaid passing through said clear section in the film, a shutter for normally preventing such light from reaching said light-sensitive device, and means operated by said correct answer selector for removing said last-mentioned shutter from light-obstructing position.

3. A quiz machine comprising a projector, including a source of light, a screen, a photographic film having thereon a question, a plurality of possible answers and the correct answer, which is one of said possible answers, said film having a clear section therein positioned in predetermined relation to the one of said possible answers which is the correct one, means for operating the projector to project said question, plurality of possible answers and correct answer toward the screen, a shutter for obscuring the correct answer from view, the question and plurality of possible answers being unobstructed and adapted to be initially thrown onto the screen, a plurality of selectors, one for each of said possible answers, means actuated by operation of any one of said selectors for removing said shutter from obscuring position to bring the correct answer into view on the screen, a correct answer indicating device, and means actuated by operation of the selector for the correct answer to operate said indicating device, said last mentioned means including a light-sensitive device adapted to be energized by light from the source aforesaid passing through said clear section in the film, a plurality of light channels, a reflector for directing said light into one of said channels determined by the position of said clear sections in the film, a normally closed shutter in each of said channels and means operated by the particular selector operated for withdrawing a corresponding one of said last-mentioned shutters, withdrawal of the shutter corresponding to the correct answer selector permitting said light to pass through the channel which is normally closed by said shutter onto said light-sensitive device to energize the same and thereby cause operation of said indicating device.

4. A quiz machine comprising a projector, including a source of light, a screen, a photographic film having thereon a question, a plurality of possible answers and the correct answer, which is one of said possible answers, said film having a clear section therein positioned in predetermined relation to the one of said possible answers which is the correct one, means for operating the projector to project said question, plurality of possible answers and correct answer toward the screen, a shutter for obscuring the correct answer from view, the question and plurality of possible answers being unobstructed and adapted to be initially thrown onto the screen, a plurality of selectors, one for each of said possible answers, means actuated by operation of any one of said selectors for removing said shutter from obscuring position to bring the correct answer into view on the screen, a correct answer indicating device, and means actuated by operation of the selector for the correct answer to operate said indicating device, said last-mentioned means including a photoelectric cell adapted to be energized by light from the source aforesaid passing through said clear section in the film, a sensitivity amplifier and a relay in series with said photoelectric cell, a switch on said relay for closing a circuit to said indicating device, a shutter for normally preventing said light from reaching said photoelectric cell, and electrical means operated by said correct answer selector for removing said last-mentioned shutter from light-obstructing position.

5. A quiz machine comprising a projector, a screen, a length of photographic film having thereon a plurality of frames each including a question, a plurality of possible answers and the correct answer, which is one of said possible answers, means for operating the projector to project the contents of one of said frames toward the screen, a shutter for obscuring the correct answer from view, the question and plurality of possible answers being unobstructed and adapted to be initially thrown onto the screen, a plurality of selectors, one for each of said possible answers, means actuated by operation of any one of said selectors for removing said shutter from obscuring position to bring the correct answer into view on the screen, a correct answer indicating device, means actuated by operation of the selector for the correct answer to operate said indicating device, and means for advancing said length of film upon each operation of the machine to cause a new frame to be brought into projecting position.

6. A quiz machine comprising a projector, a screen, a length of photographic film having thereon a plurality of frames each including a question, a plurality of possible answers and the correct answer, which is one of said possible answers, means for operating the projector to project the contents of one of said frames toward the screen, a shutter for obscuring the correct answer from view, the question and plurality of possible answers being unobstructed and adapted to be initially thrown onto the screen, a plurality of selectors, one for each of said possible answers, means actuated by operation of any one of said selectors for removing said shutter from obscuring position to bring the correct answer into view on the screen, a correct answer indicating device, means actuated by operation of the selector for the correct answer to operate said indicating device, means for advancing said length of film upon each operation of the machine to cause a new frame to be brought into projecting position, and means for at times changing the sequence in which the frames are presented for projection.

7. A quiz machine comprising a projector, a screen, a length of photographic film having thereon a plurality of frames each including a question, a plurality of possible answers, the correct answer, which is one of said possible answers, and a clear section positioned in predetermined relation to the one of said possible answers which is the correct one, means for operating the projector to project the contents of one of said frames toward the screen, a shutter for obscuring the correct answer from view, the question and plurality of possible answers being unobstructed and adapted to be initially thrown onto the screen, a plurality of selectors, one for each of said possible answers, means actuated by operation of one of said selectors for removing said shutter from obscuring position to bring the correct answer into view on the screen, a correct answer indicating device, means for moving said film upon each operation of the machine to present a new frame for projection, and an integrator for causing operation of said indicating device when the right answer is selected, said integrator comprising a photoelectric cell, means whereby said indicating device is operated by energization of said photoelectric cell, and means whereby light passing through the clear section in said film is caused to reach said photoelectric cell to energize the same by operation of the correct answer selector but is prevented from reaching said cell when any other of said selectors is operated.

8. A quiz machine comprising a projector, a screen, a length of photographic film having thereon a plurality of frames each including a question, a plurality of possible answers, the correct answer, which is one of said possible answers, and a clear section positioned in predetermined relation to the one of said possible answers which is the correct one, means for operating the projector to project the contents of one of said frames toward the screen, a shutter for obscuring the correct answer from view, the question and plurality of possible answers being unobstructed and adapted to be initially thrown onto the screen, a plurality of selectors, one for each of said possible answers, means actuated by operation of one of said selectors for removing said shutter from obscuring position to bring the correct answer into view on the screen, a correct answer indicating device, means for moving said film upon each operation of the machine to present a new frame for projection, and an integrator for causing operation of said indicating device when the right answer is selected, said integrator comprising a photoelectric cell, means whereby said indicating device is operated by energization of said photoelectric cell, and means whereby light passing through the clear section in said film is caused to reach said photoelectric cell to energize the same by operation of the correct answer selector but is prevented from reaching said cell when any other of said selectors is operated, said last-mentioned means comprising a plurality of shutters, one corresponding to each of said selectors, and individual electrical operating devices for said shutters arranged to be energized by said selectors, respectively, whereby operation of one of the selectors causes withdrawal of the corresponding shutter permitting such light to pass to said photoelectric cell if the selector operated is the one for the right answer.

9. A quiz machine comprising a projector, a screen, an endless strip of photographic film having thereon a plurality of frames each including a question, a plurality of possible answers and the correct answer, which is one of said possible answers, means for operating the projector to project the contents of one of said frames toward the screen, a shutter for obscuring the correct answer from view, the question and plurality of possible answers being unobstructed and adapted to be initially thrown onto the screen, a plurality of selectors, one for each of said possible answers, means actuated by operation of one of said selectors for removing said shutter from obscuring position to bring the correct answer into view on the screen, a correct answer indicating device, means actuated by operation of the selector for the correct answer to operate said indicating device, means for advancing said length of film upon each operation of the machine to cause a new frame to be brought into projecting position, and means for at times changing the sequence in which the frames are presented for projection.

10. A quiz machine comprising a projector, a screen, an endless strip of photographic film having thereon a plurality of frames each including a question, a plurality of possible answers and the correct answer, which is one of said possible answers, means for operating the projector to project the contents of one of said frames toward the screen, a shutter for obscuring the correct answer from view, the question and plurality of possible answers being unobstructed and adapted to be initially thrown onto the screen, a plurality of selectors, one for each of said possible answers, means actuated by operation of one of said selectors for removing said shutter from obscuring position to bring the correct answer into view on the screen, a correct answer indicating device, means actuated by operation of the selector for the correct answer to operate said indicating device, means for advancing said length of film upon each operation of the machine to cause a new frame to be brought into projecting position, said advancing means including an actuator operable by said projector operating means, a slide operable by said actuator, a locking device for limiting the movement of said slide, sprockets for engaging and moving the film, and means, including a ratchet wheel and a pawl actuated by said slide whereby said sprockets are driven by movement of said slide.

11. A quiz machine comprising a projector, a screen, a length of photographic film having thereon a plurality of frames each including a question, a plurality of possible answers and the correct answer, which is one of said possible answers, means for operating the projector to project the contents of one of said frames toward the screen, a shutter for obscuring the correct answer from view, the question and plurality of possible answers being unobstructed and adapted to be initially thrown onto the screen, a plurality of selectors, one for each of said possible answers, means actuated by operation of one of said selectors for removing said shutter from obscuring position to bring the correct answer into view on the screen, a correct answer indicating device, means actuated by operation of the selector for the correct answer to operate said indicating device, means for advancing said length of film upon each operation of the machine to cause a new frame to be brought into projecting position, said advancing means including an actuator operable by said projector operating means, a slide operable by said actuator, a locking device for limiting the movement of said slide, sprockets for engaging and moving the film, means, including a ratchet wheel and a pawl actuated by said slide whereby said sprockets are driven by movement of said slide, and means for at times changing the sequence in which the frames are presented for projection, said last-mentioned means causing disengagement of said locking device from said slide on certain operations of the machine to permit the slide to move sufficiently on such operations to cause said pawl to engage a different tooth on said ratchet wheel than if said locking device had not been disengaged, thus causing greater than normal movement of the film on the next operation.

12. A quiz machine comprising a projector, a screen, a length of photographic film having thereon a plurality of frames each including a question, a plurality of possible answers and the correct answer, which is one of said possible answers, means for operating the projector to project the contents of one of said frames toward the screen, a shutter for obscuring the correct answer from view, the question and plurality of possible answers being unobstructed and adapted to be initially thrown onto the screen, a plurality of selectors, one for each of said possible answers, means actuated by operation of one of said selectors for removing said shutter from obscuring position to bring the correct answer into view on the screen, a correct answer indicating device, means actuated by operation of the selector for the correct answer to operate said indicating device, means for advancing said length of film upon each operation of the machine to cause a new frame to be brought into projecting position, said advancing means including an actuator operable by said projector operating means, a slide operable by said actuator, a locking device for limiting the movement of said slide, sprockets for engaging and moving the film, means, including a ratchet wheel and a pawl actuated by said slide whereby said sprockets are driven by movement of said slide, and means for at times changing the sequence in which the frames are presented for projection, said last-mentioned means including an electrical device and a cam-operated switch for causing disengagement of said locking device from said slide on certain operations of the machine to permit the slide to move sufficiently on such operations to cause said pawl to engage a different tooth on said ratchet wheel than if said locking device had not been disengaged, thus causing greater than normal movement of the film on the next operation.

13. A quiz machine comprising a projector, a screen, a length of photographic film having thereon a plurality of frames each including a question, a plurality of possible answers, the correct answer, which is one of said possible answers, and a clear section positioned in predetermined relation to the one of said possible answers which is the correct one, means for operating the projector to project the contents of one of said frames toward the screen, a shutter for obscuring the correct answer from view, the question and plurality of possible answers being unobstructed and adapted to be initially thrown onto the screen, a plurality of selectors, one for each of said possible answers, means actuated by operation of one of said selectors for removing said shutter from obscuring position to bring the correct answer into view on the screen, a correct answer indicating device, means for moving said film upon each operation of the machine to present a new frame for projection, and an integrator whereby light from the projector causes operation of said indicating device when and only when the right answer is selected.

14. A quiz machine comprising a projector, a screen, a photographic film having thereon a question, a plurality of possible answers and the correct answer, which is one of said possible answers, means for operating the projector to project said question, plurality of possible answers and correct answer toward the screen, a shutter for obscuring the correct answer from view, the question and plurality of possible answers being unobstructed and adapted to be initially thrown onto the screen, a plurality of selectors, one for each of said possible answers, means for removing said shutter from obscuring position to bring the correct answer into view on the screen, a correct answer indicating device, and means actuated by operation of the selector for the correct answer to operate said indicating device.

BERT E. MILLS.